(12) United States Patent
Nozato et al.

(10) Patent No.: US 9,458,295 B2
(45) Date of Patent: Oct. 4, 2016

(54) COMPOSITE MATERIAL AND METHOD FOR PRODUCING SAME

(71) Applicants: SEKISUI CHEMICAL CO., LTD., Osaka, Osaka (JP); NATIONAL UNIVERSITY CORPORATION KUMAMOTO UNIVERSITY, Kumamoto, Kumamoto (JP)

(72) Inventors: Shoji Nozato, Osaka (JP); Akira Nakasuga, Osaka (JP); Hirotaka Ihara, Kumamoto (JP); Hullathy Subban Ganapathy, Kumamoto (JP); Makoto Takafuji, Kumamoto (JP)

(73) Assignees: SEKISUI CHEMICAL CO., LTD., Osaka (JP); NATIONAL UNIVERSITY CORPORATION KUMAMOTO UNIVERSITY, Kumamoto (JP)

( * ) Notice: Subject to any disclaimer, the term of this patent is extended or adjusted under 35 U.S.C. 154(b) by 0 days.

(21) Appl. No.: 14/877,597

(22) Filed: Oct. 7, 2015

(65) Prior Publication Data

US 2016/0024259 A1 Jan. 28, 2016

Related U.S. Application Data

(63) Continuation of application No. 13/885,283, filed as application No. PCT/JP2012/063619 on May 28, 2012, now Pat. No. 9,284,417.

(30) Foreign Application Priority Data

Jun. 3, 2011 (JP) ................................ 2011-125471

(51) Int. Cl.
| | |
|---|---|
| *C08J 3/12* | (2006.01) |
| *C01B 31/04* | (2006.01) |
| *B82Y 30/00* | (2011.01) |
| *B82Y 40/00* | (2011.01) |
| *C08J 7/06* | (2006.01) |

(52) U.S. Cl.
CPC ............... *C08J 3/128* (2013.01); *B82Y 30/00* (2013.01); *B82Y 40/00* (2013.01); *C01B 31/0423* (2013.01); *C01B 31/0446* (2013.01); *C08J 3/12* (2013.01); *C08J 7/06* (2013.01); *C08J 2325/06* (2013.01); *C08J 2325/14* (2013.01); *C08J 2333/12* (2013.01); *Y02P 20/544* (2015.11); *Y10T 428/2998* (2015.01)

(58) Field of Classification Search
CPC .. C08J 3/128; C08J 2325/06; C08J 2333/12; C08J 2325/14; C01B 31/0423; C01B 31/0446; B82Y 30/00; B82Y 40/00; Y10T 428/2998
USPC ........................................................ 428/403
See application file for complete search history.

(56) References Cited

U.S. PATENT DOCUMENTS

| | | | | |
|---|---|---|---|---|
| 7,071,258 | B1 * | 7/2006 | Jang et al. | ..... 524/496 |
| 8,075,864 | B2 * | 12/2011 | Choi et al. | ..... 423/448 |
| 8,535,553 | B2 * | 9/2013 | Kong et al. | ..... 216/95 |
| 2006/0257633 | A1 | 11/2006 | Inoue et al. | |
| 2006/0281306 | A1 | 12/2006 | Gstrein et al. | |
| 2007/0284557 | A1 | 12/2007 | Gruner et al. | |
| 2009/0155467 | A1 | 6/2009 | Wang et al. | |
| 2009/0159198 | A1 | 6/2009 | Wang et al. | |
| 2009/0181239 | A1 | 7/2009 | Fan et al. | |
| 2009/0227162 | A1 | 9/2009 | Kruckenberg et al. | |
| 2010/0044646 | A1 | 2/2010 | Zhamu et al. | |
| 2010/0147188 | A1 | 6/2010 | Mamak et al. | |
| 2010/0247892 | A1 | 9/2010 | Lee et al. | |
| 2011/0014457 | A1 * | 1/2011 | Quitoriano et al. | ..... 428/336 |
| 2012/0082787 | A1 | 4/2012 | Fujita | |
| 2012/0241692 | A1 | 9/2012 | Yajima et al. | |
| 2012/0258311 | A1 | 10/2012 | Hong et al. | |
| 2015/0068684 | A1 | 3/2015 | Hong et al. | |

FOREIGN PATENT DOCUMENTS

| | | |
|---|---|---|
| CN | 1881077 A | 12/2006 |
| CN | 1986631 A | 6/2007 |
| CN | 101462391 A | 6/2009 |
| CN | 101466598 A | 6/2009 |
| CN | 101480858 A | 7/2009 |
| EP | 2412670 * | 3/2010 |
| EP | 2 412 670 A1 | 2/2012 |
| EP | 2 594 613 A2 | 5/2013 |
| GB | 2 442 634 A | 4/2008 |
| JP | 2003-277471 A | 10/2003 |
| JP | 2005-272541 A | 10/2005 |
| JP | 2008-201635 A | 9/2008 |
| JP | 2008-544495 A | 12/2008 |

(Continued)

OTHER PUBLICATIONS

International Search Report for the Application No. PCT/JP2012/063619 mailed Aug. 28, 2012.
Written Opinion of the International Searching Authority (PCT/ISA/237) for Applicatin No. PCT/JP2012/063619 mailed Aug. 28, 2012.

(Continued)

*Primary Examiner* — Leszek Kiliman
(74) *Attorney, Agent, or Firm* — Cheng Law Group, PLLC

(57) ABSTRACT

A composite material in which a graphene-like carbon material has excellent adhesion to a substrate composed of resin, and a method for producing the same are provided. The composite material comprises a substrate composed of resin and a graphene-like carbon material layer provided so as to cover at least part of the surface of the substrate, wherein graphene-like carbon is closely attached to the surface of the substrate. The method for producing a composite material comprises bringing a graphene-like carbon material into contact with at least part of the surface of a substrate composed of resin and heating under the action of a supercritical or subcritical fluid.

4 Claims, 10 Drawing Sheets

(56) References Cited

FOREIGN PATENT DOCUMENTS

| | | | |
|---|---|---|---|
| JP | 2010-189621 A | | 9/2010 |
| JP | 2010-245022 A | | 10/2010 |
| JP | 2011-32156 A | | 2/2011 |
| JP | 2011-066057 | * | 3/2011 |
| JP | 2011-66057 A | | 3/2011 |
| JP | 2011-513167 A | | 4/2011 |
| JP | 2013-508247 A | | 3/2013 |
| TW | 201000398 A1 | | 1/2010 |
| WO | WO-2006/133318 A1 | | 12/2006 |
| WO | WO-2009/106507 A2 | | 9/2009 |
| WO | WO2010/110153 | * | 9/2010 |
| WO | WO-2010/110153 A1 | | 9/2010 |
| WO | WO-2011/046415 A2 | | 4/2011 |

OTHER PUBLICATIONS

Supplementary European Search Report for the Application No. EP 12 79 3775 dated Nov. 17, 2014.

* cited by examiner

COMPOSITE MATERIAL AND METHOD FOR PRODUCING SAME

CROSS REFERENCE TO RELATED APPLICATIONS

This application is a Continuation Application of patent application Ser. No. 13/885,283, filed on May 14, 2013 which is a 371 application of Application No. PCT/JP2012/063619, filed on May 28, 2012 which is based on Japanese Patent Application No. 2011-125471 filed on Jun. 3, 2011, the entire contents of which are hereby incorporated by reference.

TECHNICAL FIELD

The present invention relates to a composite material comprising resin and a graphene-like carbon material such as graphene or lamina graphite, and more specifically to a composite material in which a graphene-like carbon material has a higher adhesion to a substrate composed of resin, and a method for producing the same.

BACKGROUND ART

In the past, carbon materials such as graphite, carbon nanotube, carbon fiber and carbon particles have been widely used as a reinforcing agent or a filler for resin. Also, lamina graphite with a smaller number of graphene layers, which is prepared by the exfoliation of graphite, has been recently attracting attention.

As a composite material of carbon materials and resin described above, a composite material, prepared by dispersing a carbon material such as carbon fiber in an epoxy resin is known as described in the following Patent Literature 1.

CITATION LIST

Patent Literature

Patent Literature 1: Japanese Patent Laid-Open No. 2003-277471

SUMMARY OF INVENTION

Technical Problem

However, conventional composite materials of resin and carbon materials had a problem of poor adhesion strength between resin and carbon materials. For example, although physical properties of a composite material prepared by dispersing a carbon material in resin were improved by the addition of the carbon material, as described in Patent Literature 1, the adhesion strength to the carbon material was insufficient.

An object of the present invention is to solve the above defect of the conventional art and provide a composite material having excellent adhesion between resin and a graphene-like carbon material, and a method for producing the same.

Solution to Problem

The composite material according to the present invention comprises a substrate composed of resin and a graphene-like carbon material layer provided so as to cover at least part of the surface of the substrate, wherein graphene-like carbon is closely attached to the surface of the substrate.

In a particular aspect of the composite material according to the present invention, some of the graphene-like carbon penetrates the substrate from the surface of the substrate toward the inner part. As a result, the adhesion between the two is further improved.

In another particular aspect of the composite material according to the present invention, the substrate composed of resin is of fine resin particles and the graphene-like carbon material layer is formed so as to cover the outer surface of the fine resin particles. In this aspect, since the outer surface of the fine resin particles is covered with the graphene-like carbon material layer and some of the graphene-like carbon penetrates the surface of the fine resin particles, the adhesion between the fine resin particles and the graphene-like carbon material layer is improved. Furthermore, the composite material in the form of fine particles which has a graphene-like carbon material layer on the surface is less likely to coagulate. Therefore, the composite material can be handled as a so-called free flowing powder.

In another particular aspect of the composite material according to the present invention, the substrate composed of resin is a sheet substrate and the graphene-like carbon material layer is provided on at least one side of the sheet substrate. In this aspect, a sheet composite material having excellent adhesion between a carbon material layer and a sheet substrate can be provided according to the present invention.

In the composite material according to the present invention, preferably the graphene-like carbon material is composed of graphene or lamina graphite. Since graphene and lamina graphite have a high aspect ratio and have a small number of graphene layers, they can improve physical properties of a composite material when added even in small amounts.

The method for producing a composite material according to the present invention is one for producing a composite material configured according to the present invention, and the method comprises a step of providing a substrate composed of resin and a graphene-like carbon material and a step of bringing the graphene-like carbon material into contact with at least part of the surface of the substrate composed of resin and heating under the action of a supercritical or subcritical fluid.

In the method according to the present invention, preferably supercritical or subcritical $CO_2$ is used as the supercritical or subcritical fluid. $CO_2$ becomes supercritical at a temperature of about 31.1° C. and a pressure of about 7.52 MPa. Therefore $CO_2$ can swell the surface of the substrate composed of resin in a milder condition compared to the case of using $H_2O$ or the like. Thus, even when a resin having a low glass transition temperature is used, the composite material of the present invention can be reliably obtained.

Advantageous Effects of Invention

In the composite material according to the present invention, graphene-like carbon is closely attached to a substrate composed of resin, and therefore a composite material having excellent adhesion between a graphene-like carbon material layer and a substrate can be prepared.

Also, in the production method according to the present invention, by heating with allowing a supercritical or subcritical fluid to act on resin, a graphene-like carbon material layer is formed on the surface of resin in such a way that graphene-like carbon is closely attached to the surface of a substrate composed of resin. Thus, a composite material of the present invention having a graphene-like carbon material layer which has excellent adhesion to a substrate composed of resin can be prepared. Also, in the production method of the present invention, since a graphene-like carbon material layer is formed on the surface of a substrate as described above, the shape of the substrate is not particularly limited. Therefore, a graphene-like carbon material layer can be easily formed, according to the present invention, on the surface of not only a fine particle substrate such as fine resin particles or a sheet substrate, but also a substrate composed of resin having a complicated shape.

Further, although fine carbon material particles, i.e., a material to be dispersed, are highly cohesive and thus have been difficult to homogeneously disperse and attach, the production method of the present invention easily enables such fine carbon material particles to be closely attached to the surface of a substrate.

DESCRIPTION OF EMBODIMENTS

Figure 1:
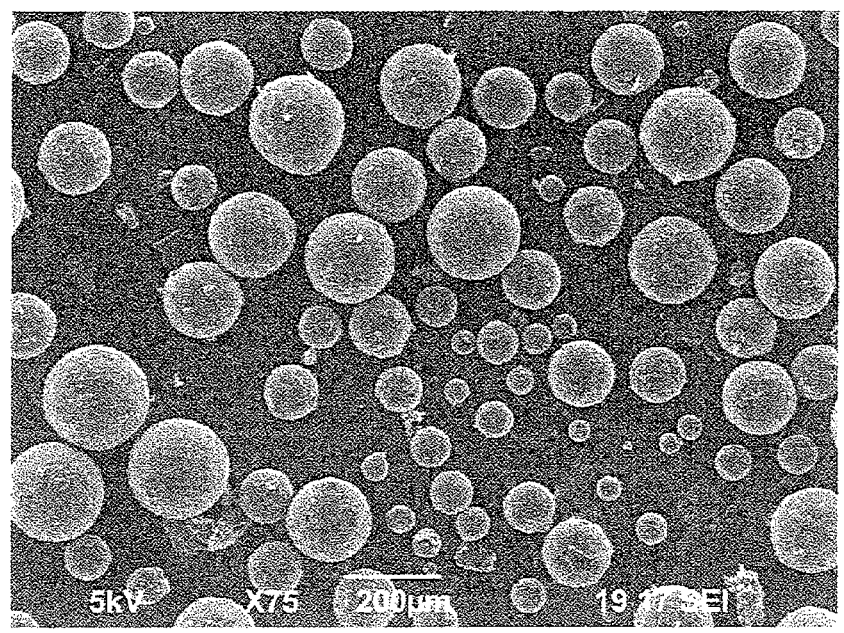
FIG. 1 is a scanning electron micrograph (75×) of fine particles prepared by mixing 1 g of polymethyl methacrylate fine particles and 0.01 g of lamina graphite and allowing supercritical carbon dioxide (65° C., 35 MPa) to act on the mixture for 5 hours.

Hereinafter specific embodiments of the present invention will be shown in order to describe the present invention.
(Substrate Composed of Resin)

A substrate composed of resin is used for the composite material and the method for producing the same according to the present invention. As the resin constituting the substrate, an appropriate resin can be used such that its surface may be softened by heating under the action of a supercritical or subcritical fluid. The resin may be synthetic or natural.

As the above resin, those having a glass transition temperature Tg that causes softening at a temperature at which a supercritical or subcritical fluid is allowed to act are preferred. As described later, $CO_2$ is preferably used as the fluid allowed to act in a supercritical or subcritical state. Thus resins such as polystyrene, polypropylene, polymethyl methacrylate (PMMA) and cellulose may be preferably used. The resin may be a copolymer of monomers constituting such polymers. Of course, as the resin material used in the present invention, various (meth)acrylic resins in addition to PMMA or various polyolefins in addition to polypropylene may also be used.

Even the shape of the above substrate composed of resin is not particularly limited. The substrate may be fine resin particles. In other words, the substrate may be in the form of fine particles. The diameter of fine particles is not particularly limited, and fine particles with an average diameter of 200 μm or less are preferably used. A substrate composed of resin in the form of particles larger than those may also be used. When the substrate composed of resin is in the form of particles, the composite material prepared according to the present invention is less likely to coagulate as described later. Therefore, the composite material can be handled as a free flowing powder.

Alternatively, the substrate composed of resin may be in the form of sheet. In the case of a sheet substrate, a graphene-like carbon material layer may be formed on at least part of one side and/or the opposite side of the sheet substrate according to the present invention.

Further, the substrate composed of resin used in the present invention may not be necessarily in the form of particles or sheet. In other words, the substrate composed of resin may have a complicated three-dimensional shape as long as a graphene-like carbon material can be brought into contact with at least part of the surface of the substrate composed of resin and a supercritical or subcritical fluid is allowed to act thereon in that state. Even in that case, a composite material with a complicated three-dimensional shape having a graphene-like carbon material layer on the surface can be prepared according to the present invention. Moreover, a graphene-like carbon material may be selectively formed on part of the complicated surface of the substrate.
(Graphene-Like Carbon Material Layer)

In the composite material according to the present invention, a graphene-like carbon material layer is provided so as to cover at least part of the surface of the substrate composed of resin described above. As a graphene-like carbon material constituting the graphene-like carbon material layer, graphene or lamina graphite may be preferably used. As is known, graphite is a stack of graphene. Lamina graphite is prepared by the exfoliation of graphite, and in a lamina graphite stack, the number of graphene layers is several to about 200. Also, lamina graphite has a specific surface area of 600 $m^2/g$ or more, which is much greater than that of graphite. In the present invention, the above lamina graphite is prepared by the exfoliation of graphite, and is a graphene stack having the number of graphene layers as described above.

As the above lamina graphite, a commercially available lamina graphite may be used. Alternatively, various methods of exfoliating graphite may be employed to prepare lamina graphite.

The method of preparing lamina graphite described above is not particularly limited, and lamina graphite may be prepared by the exfoliation of expanded graphite prepared by expanding graphite. For the process of expanding graphite to prepare expanded graphite, 1) a method of immersing layer graphite in an electrolyte solution and heating, or 2) an electrolysis method may be used.

The process 1) comprises immersing layer graphite in nitric acid or sulfuric acid and heating, thereby intercalating nitrate ions or sulfate ions between layers. In this case, it is desirable that the nitric acid concentration or the sulfuric acid concentration is about 40% by weight to 70% by weight. A concentration within the range ensures reliable intercalation of nitrate ions or sulfate ions between layers. It is preferable that the heating temperature is 20° C. or more and 50° C. or less. A temperature within the range ensures reliable intercalation of the nitrate ions or sulfate ions between layers.

In the electrolysis process of 2), layer graphite is set at a working electrode, and the working electrode and a counter electrode composed of Pt or the like are immersed in nitric acid or sulfuric acid, and electrolysis is carried out. This enables electrolyte ions such as nitrate ions or sulfate ions to be intercalated between layers of layer graphite, i.e., between graphenes, and thus the interlayer distance can be increased.

Next, the sheet of expanded graphite prepared as described above is washed with water or the like and dried to remove nitrate ions, sulfate ions or the like. A dry sheet of expanded graphite can be prepared in this way. For preparing lamina graphite by the exfoliation of expanded graphite, heating or application of ultrasound may be employed.

As the graphene-like carbon material in the present invention, not only graphene or lamina graphite, but also various graphene-like carbon materials which have a graphene sheet structure on the surface, such as carbon nanotube, may be used.

In the present invention, the thickness of the above graphene-like carbon material layer is not particularly limited, and may be properly determined according to the purpose of use. In the case of providing a graphene-like carbon material layer on the surface of a substrate composed of fine resin particles, the graphene-like carbon material layer has a thickness of about 0.5 nm to 500 nm. Likewise, even in the case of providing a graphene-like carbon material layer on at least one side of a sheet substrate, the graphene-like carbon material layer may have a thickness of about 0.5 nm to 500 nm.

When the graphene-like carbon material layer is too thick, the advantageous effect of resin physical properties may not be obtained. On the other hand, when the graphene-like carbon material layer is too thin, sufficient effect of improving physical properties caused by providing the graphene-like carbon material layer may not be obtained.

In the present invention, some of the graphene-like carbon constituting the above graphene-like carbon material layer is closely attached to the surface of a substrate. Preferably some of the graphene-like carbon penetrates the substrate from the surface of the substrate toward the inner part. This causes an anchor effect that improves the adhesion between the graphene-like carbon material layer and the substrate composed of resin effectively.

The composite material of the present invention in which graphene-like carbon has excellent adhesion to the surface of a substrate, more preferably the composite material of the present invention in which some of the graphene-like carbon penetrates the substrate from the surface of the substrate toward the inner part, can be prepared by the production method of the present invention.

(Production Method)

In the production method of the present invention, first the above substrate composed of resin and the above graphene-like carbon material are prepared. Next, the above graphene-like carbon material is brought into contact with at least part of the surface of the substrate composed of resin and in that state heating is carried out under the action of a supercritical or subcritical fluid. $CO_2$, $H_2O$ or the like may be used as the supercritical or subcritical fluid.

$CO_2$ is supercritical at a temperature of 31.1° C. and a pressure of about 7.52 MPa. $CO_2$ is subcritical at −56.6° C. to 31.1° C. and a pressure ranging from about 0.528 MPa to 7.52 MPa. Heating with allowing a supercritical or subcritical fluid to act thereon causes softening of the surface of a substrate composed of resin. As a result, graphene-like carbon comes into contact with the softened surface of the substrate. Preferably, some of the graphene-like carbon penetrates the surface of the substrate. Thus, when they are cooled after heating, a graphene-like carbon material layer is formed so as to cover at least part of the surface of the substrate, with graphene-like carbon closely attached to the surface of the substrate. Thus, the composite material of the present invention can be prepared.

For this reason, it is desirable that the resin constituting the above substrate composed of resin has a glass transition temperature Tg within the range of temperature and atmosphere in the process of heating under the action of a supercritical or subcritical fluid. More specifically, the resin has a glass transition temperature Tg of desirably in the above heating temperature range of −100° C. to +100° C. A glass transition temperature Tg in this range ensures reliable penetration of some of the graphene-like carbon into the surface of the substrate composed of resin.

For bringing a graphene-like carbon material into contact with the surface of the above substrate composed of resin, the material may be brought into contact with at least part of the surface of the substrate as described above. The graphene-like carbon material, however, may also be brought into contact with the entire surface of the substrate.

Further, since a graphene-like carbon material is brought into contact with at least part of the surface of the substrate and heating is carried out in that state under the action of a supercritical or subcritical fluid as described above, the graphene-like carbon material can be brought into contact with part of the surface of the substrate selectively and thus even a composite material in which a graphene-like carbon material layer is selectively provided on part of the surface of the substrate can be easily prepared. In addition, as described above, even in the case of using a substrate having a complicated three-dimensional shape, a graphene-like carbon material layer can be easily and reliably formed on the surface of the substrate according to the present invention.

(Physical Properties of Composite Material)

In the composite material according to the present invention, a graphene-like carbon material has an improved adhesion to the surface of a substrate as described above, and preferably a graphene-like carbon material layer is formed in such a manner that part of the graphene-like carbon material penetrates the surface of the substrate composed of resin. As a result, the adhesion between the graphene-like carbon material layer and the substrate can be effectively improved. Therefore, the graphene-like carbon material layer is less likely to be separated from the substrate even if exposed to an environment with heat history. Further, due to the excellent adhesion, the carbon material is effective in improving mechanical strength and the like.

In addition, the experiments by the present inventors have shown that a composite material in which the above graphene-like carbon material layer is formed on, for example, PMMA according to the present invention has a higher glass transition temperature Tg. Therefore, a composite material having excellent heat resistance can be provided. It is considered that Tg of the composite material becomes higher as described above by a stronger interaction between graphene-like carbon and resin caused by the improved adhesion between the graphene-like carbon material and the surface of PMMA.

Even in the case of using resin other than PMMA, the Tg of the composite material can be effectively improved from the Tg of the original resin by forming a graphene-like carbon material layer according to the present invention. Therefore, a composite material having excellent heat resistance can be provided.

Hereinafter Examples and Comparative Examples of the present invention will be described. The present invention is not limited to the following Examples.

Example 1

1) Preparation of Lamina Graphite

Product No: PF100-UHP available from Toyo Tanso Co., Ltd. was prepared as a raw material graphite sheet. A low density graphite sheet with a density of 0.7 and a thickness of 1 mm was prepared by the same production method as that of the above graphite sheet at a lower rolling ratio in rolling.

The graphite sheet with a density of 0.7 prepared as described above was cut into 3 cm×3 cm to prepare a graphite sheet as an electrode material. Two slits were cut in the graphite sheet in a length of 1 cm and a width of 1 cm with a cutter knife. An electrode composed of Pt was inserted into the graphite sheet in which two slits were formed. The graphite sheet prepared as described above which was employed as a working electrode (anode), a counter electrode (cathode) composed of Pt and a reference electrode composed of Ag/AgCl were immersed in an aqueous nitric acid solution at a concentration of 60% by weight and a DC voltage was applied thereto to carry out an electrochemical treatment. In this way, the graphite used at the anode as a working electrode was formed into expanded graphite.

Next, the resulting expanded graphite was dried and cut into 1 cm square pieces and one of them was put in a carbon crucible to be subjected to electromagnetic induction heating. This was carried out by using induction heating equipment MU 1700D made by SK MEDICAL ELECTRONICS CO., LTD. in argon gas atmosphere with the highest temperature reached of 550° C. at a current amount of 10 A. The expanded graphite was exfoliated by the electromagnetic induction heating. The specific surface area of the resulting lamina graphite powder was measured by using specific surface area analyzer ASAP-2000 made by Shimadzu Corporation with nitrogen gas and as a result, the specific surface area was 850 $m^2/g$ in a single measurement.

2) Production of Composite Material

Fine particles of polymethyl methacrylate (available from Sigma-Aldrich Co., LLC., Product No.: 445746-500G, Mw: 350,000, Tg: 122° C.) were prepared as a substrate composed of resin. 1.0 g of the polymethyl methacrylate fine particles and 0.01 g of lamina graphite prepared as described above were put in a pressure vessel. 10 mL of $CO_2$ which is supercritical at room temperature (23° C.) and a pressure of 10 MPa was added thereto, and then $CO_2$ was once removed (for drying by removing water). Thereafter 10 mL of $CO_2$ which is supercritical at room temperature (23° C.) and a pressure of 10 MPa was added thereto again. Subsequently the temperature was increased to 65° C. and the mixture was heated for 5 hours with stirring. The pressure increased to about 35 MPa at this stage. Then the resultant was cooled to room temperature to prepare a composite material. The resulting composite material was in the form of particles and had an average particle size of 120 µm. Also, the surface of the composite material particles prepared as described above was observed by a scanning electron microscope (JCM-5700 made by JEOL Ltd.).

Figure 2:
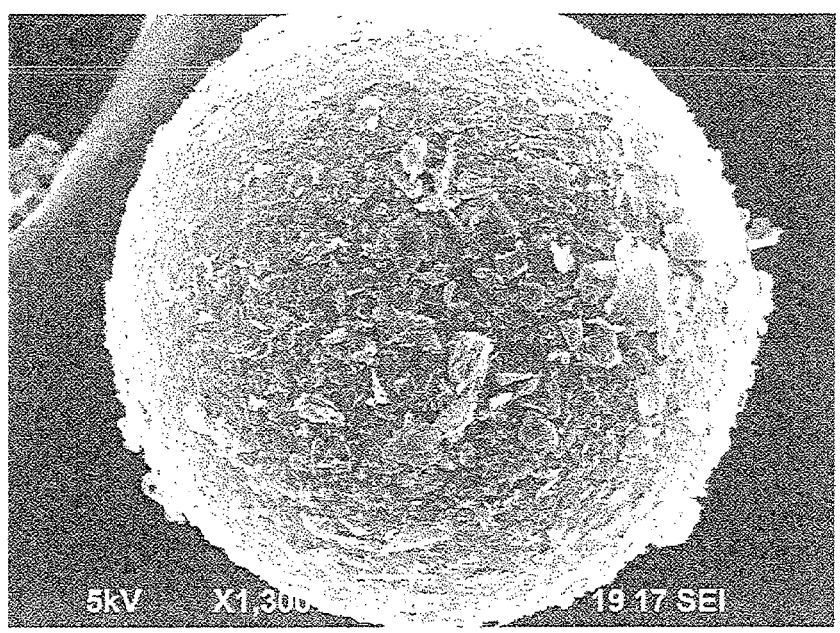
FIG. 2 is a scanning electron micrograph (1300×) of fine particles prepared by mixing 1 g of polymethyl methacrylate fine particles and 0.01 g of lamina graphite and allowing supercritical carbon dioxide (65° C., 35 MPa) to act on the mixture for 5 hours.

FIG. 1 is a scanning electron micrograph of the composite material particles prepared in Example 1 magnified 75 times; and FIG. 2 is a scanning electron micrograph of the surface of the particles enlarged 1300 times.

Figure 3:
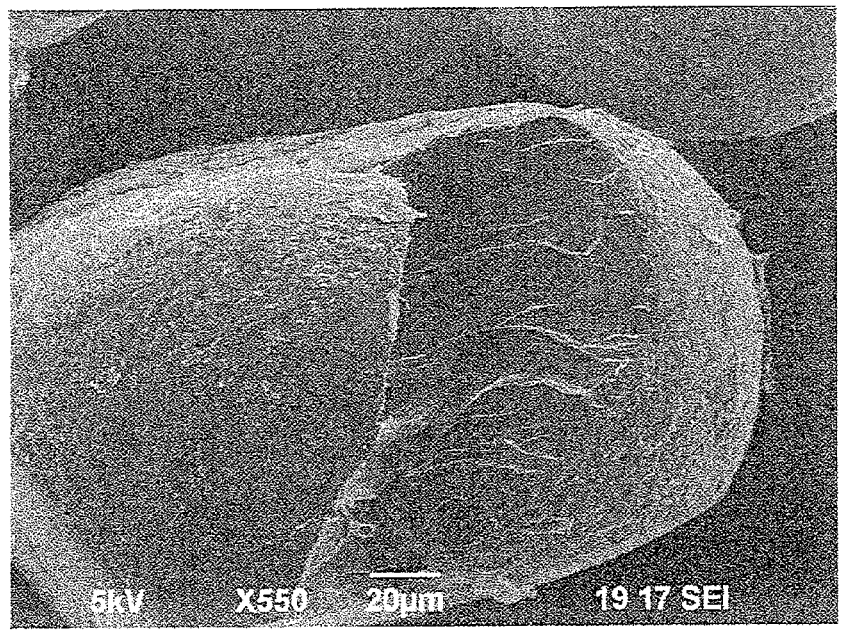
FIG. 3 is a scanning electron micrograph (550×) of a cross section of a fine particle prepared by mixing 1 g of polymethyl methacrylate fine particles and 0.01 g of lamina graphite and allowing supercritical carbon dioxide (65° C., 35 MPa) to act on the mixture for 5 hours.

Some of the above particles were broken by using a mortar and the broken particles were also observed by the scanning electron microscope (JCM-5700 made by JEOL Ltd.). FIG. 3 is a scanning electron micrograph magnified 550 times taken as described above. As can be seen from FIG. 1 to FIG. 3, in the resulting composite material, a graphene-like carbon material is formed on the surface of fine particles. In particular, the micrograph of FIG. 3 shows that graphene-like carbon is accumulated on the surface of substrate particles.

Example 2

0.005 g of the same lamina graphite as that in Example 1 and 1.0 g of fine particles of polymethyl methacrylate (available from Sigma-Aldrich Co., LLC., Product No: 445746-500G, Mw: 350,000, Tg: 122° C.) were mixed and put in a pressure vessel as in Example 1. 10 mL of $CO_2$ which is supercritical at room temperature (23° C.) and a pressure of 10 MPa was added thereto, and then $CO_2$ was once removed (for drying by removing water). Thereafter 10 mL of $CO_2$ which is supercritical at room temperature (23° C.) and a pressure of 10 MPa was added thereto again. Subsequently the temperature was increased to 65° C. and the mixture was heated for 5 hours with stirring. The pressure increased to about 35 MPa at this stage. Then the resultant was cooled to room temperature to prepare a composite material. The resulting composite material was in the form of particles and had an average particle size of 120 µm. Also, the surface of the composite material particles prepared as described above was observed by a scanning electron microscope (JCM-5700 made by JEOL Ltd.).

Figure 4:
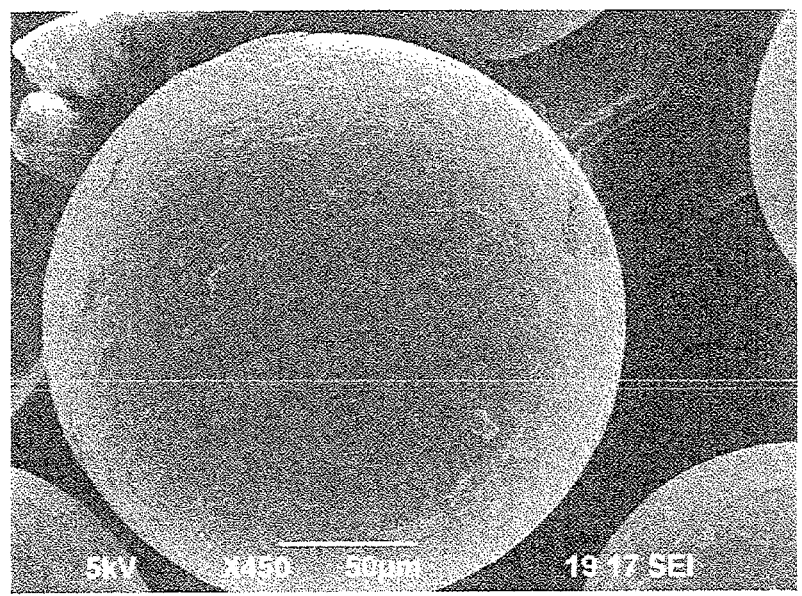
FIG. 4 is a scanning electron micrograph (450×) of fine particles prepared by mixing 1 g of polymethyl methacrylate fine particles and 0.005 g of lamina graphite and allowing supercritical carbon dioxide (65° C., 35 MPa) to act on the mixture for 5 hours.

FIG. 4 is a scanning electron micrograph of the composite material particles prepared in Example 2 magnified 450 times. The micrograph of FIG. 4 shows that some of the graphene-like carbon has penetrated the surface of the original substrate particles composed of resin.

Comparative Example 1

Figure 5:
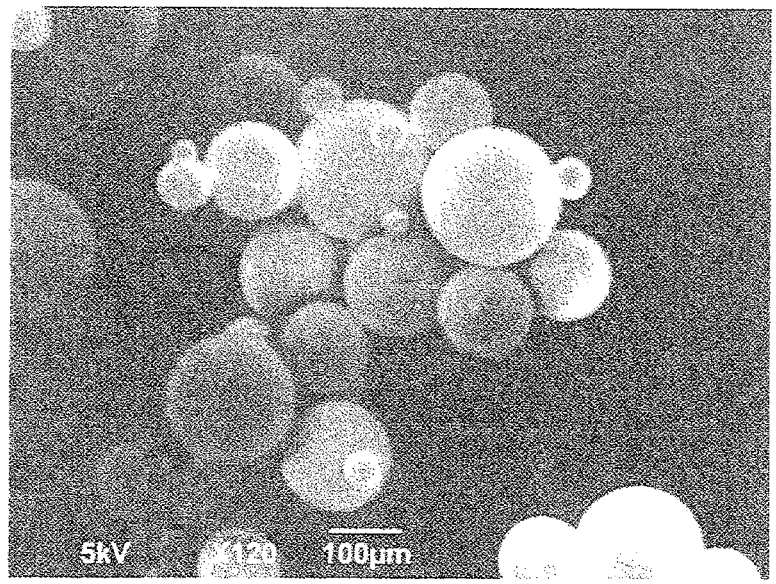
FIG. 5 is a scanning electron micrograph (120×) of polymethyl methacrylate fine particles after allowing supercritical carbon dioxide (65° C., 35 MPa) to act on the fine particles for 5 hours.

For Comparative Example, polymethyl methacrylate fine particles which were the material in Example were prepared. FIG. 5 shows a scanning electron micrograph of the polymethyl methacrylate fine particles magnified 120 times. As can be seen from FIG. 5, no graphene-like carbon is present on the surface of the polymethyl methacrylate fine particles and therefore the particles have a smooth surface.

Example 3

0.01 g of the same lamina graphite as that in Example 1 and 1.0 g of fine particles of polystyrene (available from Sekisui Plastics Co., Ltd., Product No: S-20, average particle size: 300 µm, Tg: 106° C.) were mixed and put in a pressure vessel as in Example 1. 10 mL of $CO_2$ which is supercritical at room temperature (23° C.) and a pressure of 10 MPa was added thereto, and then $CO_2$ was once removed (for drying by removing water). Thereafter 10 mL of $CO_2$ which is supercritical at room temperature (23° C.) and a pressure of 10 MPa was added thereto again. Subsequently the temperature was increased to 55° C. and the mixture was heated for 12 hours with stirring. The pressure increased to about 28 MPa at this stage. Then the resultant was cooled to room temperature to prepare a composite material. The surface of the composite material particles prepared was observed by a scanning electron microscope (JCM-5700 made by JEOL Ltd.).

Figure 6:
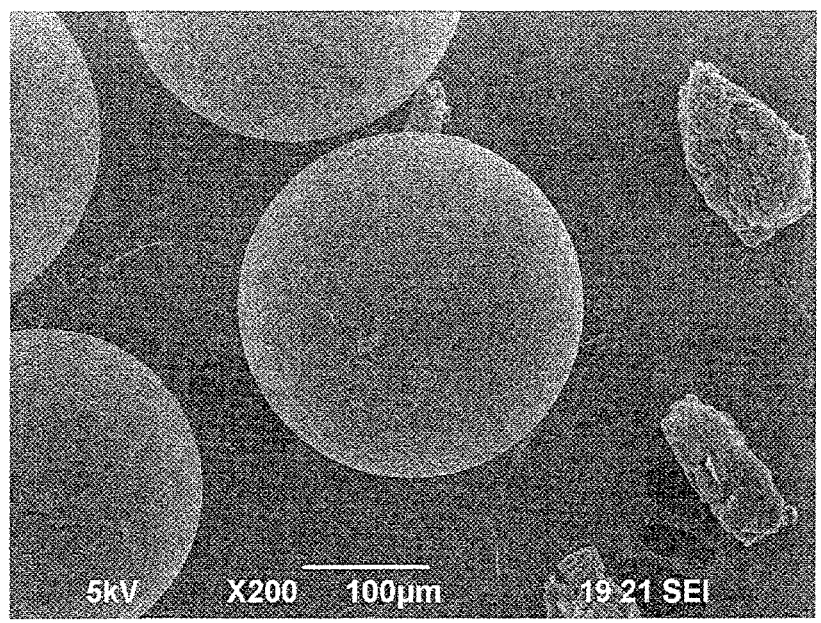
FIG. 6 is a scanning electron micrograph (200×) of fine particles prepared by mixing 1 g of polystyrene fine particles (Product No. S-20 available from Sekisui Plastics Co., Ltd.) and 0.01 g of lamina graphite and allowing supercritical carbon dioxide (55° C., 28 MPa) to act on the mixture for 12 hours.
Figure 7:
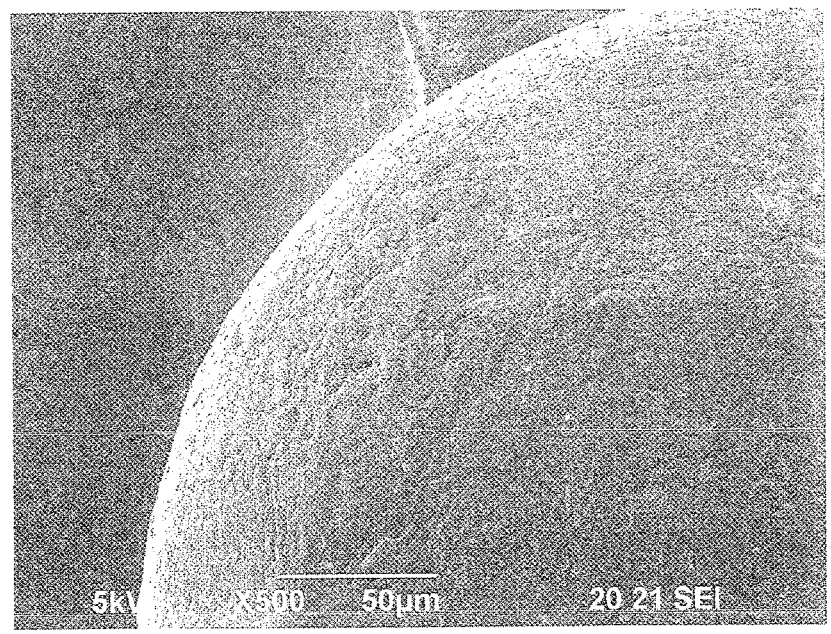
FIG. 7 is a scanning electron micrograph (500×) of fine particles prepared by mixing 1 g of polystyrene fine particles (Product No. S-20 available from Sekisui Plastics Co., Ltd.) and 0.01 g of lamina graphite and allowing supercritical carbon dioxide (55° C., 28 MPa) to act on the mixture for 12 hours.

FIG. 6 and FIG. 7 are a scanning electron micrograph of the composite material particles prepared in Example 3 magnified 200 and 500 times, respectively. The micrographs of FIG. 6 and FIG. 7 show that some of the graphene-like carbon has penetrated the surface of the original substrate particles composed of resin.

Comparative Example 2

Figure 8:
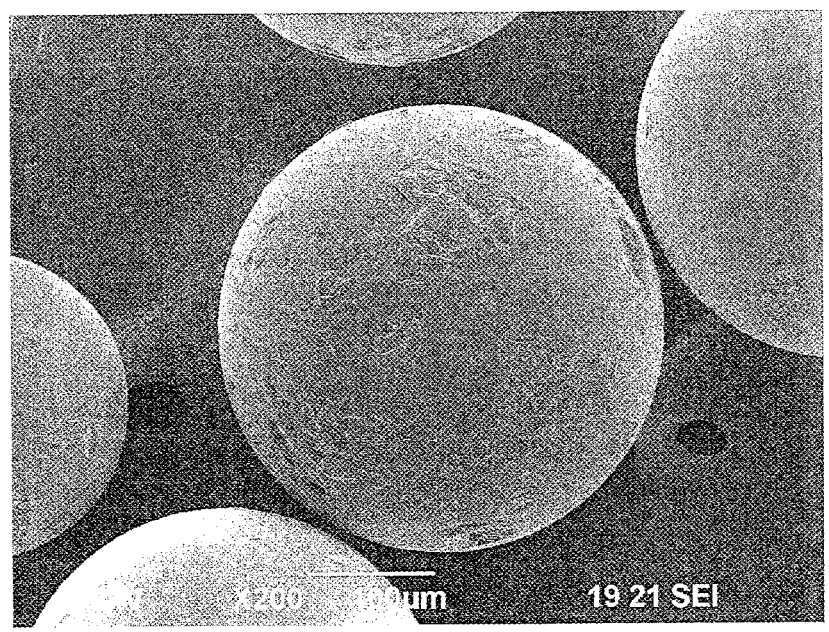
FIG. 8 is a scanning electron micrograph (200×) of polystyrene fine particles (Product No. S-20 available from Sekisui Plastics Co., Ltd.) after allowing supercritical carbon dioxide (55° C., 28 MPa) to act on the fine particles for 5 hours.

Polystyrene fine particles which were the material in Example 3 were prepared. FIG. 8 shows a scanning electron micrograph of the polystyrene fine particles magnified 200 times. As can be seen from FIG. 8, no graphene-like carbon is present on the surface of the polystyrene fine particles and therefore the particles have a smooth surface.

Example 4

A composite material was prepared in the same manner as in Example 3 except for mixing 0.001 g of the same lamina graphite as that in Example 1 and 1.0 g of fine particles of polystyrene (available from Sekisui Plastics Co., Ltd., Product No: S-30, average particle size: 800 µm, Tg: 105° C.), increasing the temperature to 60° C. and heating for 4.5 hours with stirring. The pressure increased to 28 MPa at the time of mixing. The surface of the composite material particles prepared was observed by a scanning electron microscope (JCM-5700 made by JEOL Ltd.).

Figure 9:
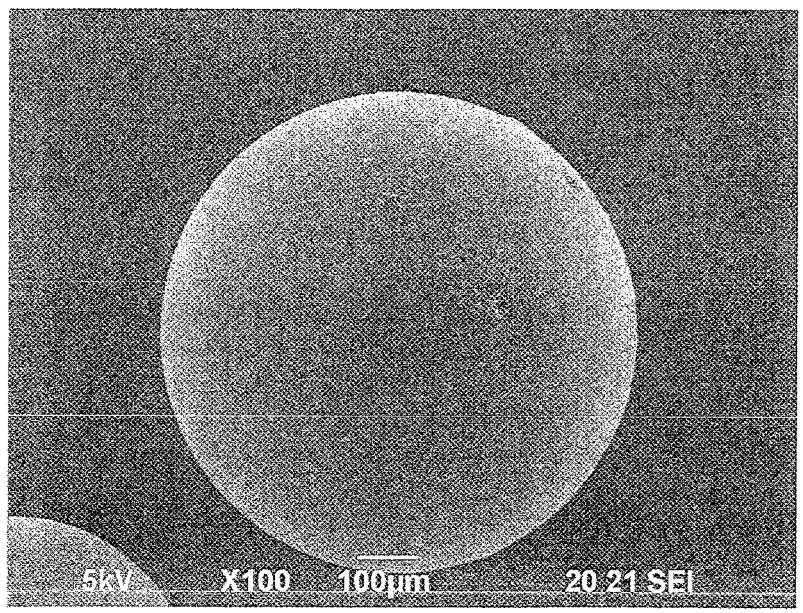
FIG. 9 is a scanning electron micrograph (100×) of fine particles prepared by mixing 1 g of polystyrene fine particles (Product No. S-30 available from Sekisui Plastics Co., Ltd.) and 0.001 g of lamina graphite and allowing supercritical carbon dioxide (60° C., 28 MPa) to act on the mixture for 4.5 hours.
Figure 10:
FIG. 10 is a scanning electron micrograph (500×) of fine particles prepared by mixing 1 g of polystyrene fine particles (Product No. S-30 available from Sekisui Plastics Co., Ltd.) and 0.001 g of lamina graphite and allowing supercritical carbon dioxide (60° C., 28 MPa) to act on the mixture for 4.5 hours.

FIG. 9 and FIG. 10 are a scanning electron micrograph of the composite material particles prepared in Example 4 magnified 100 and 500 times, respectively. The micrograph of FIG. 5 shows that some of the graphene-like carbon has penetrated the surface of the original substrate particles composed of resin.

Comparative Example 3

Figure 11:
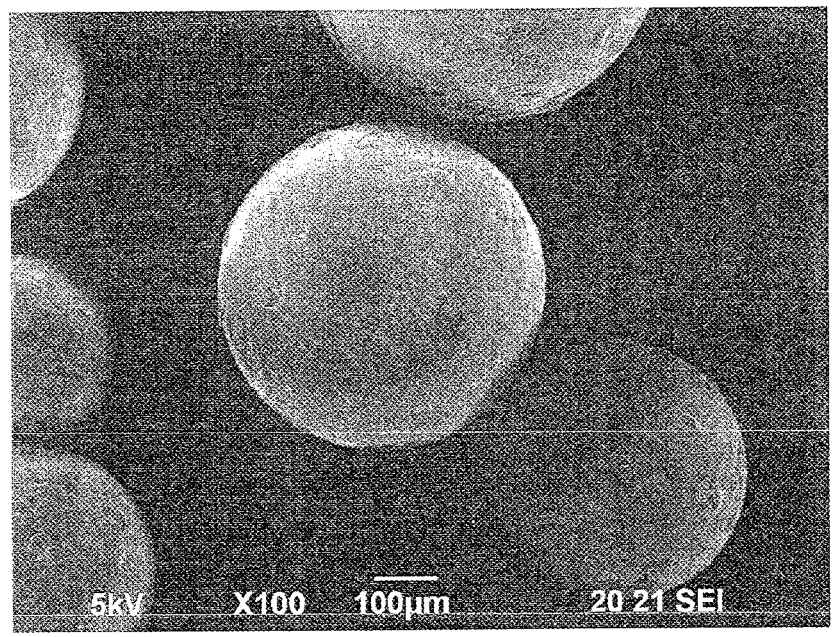
FIG. 11 is a scanning electron micrograph (100×) of polystyrene fine particles (Product No. S-30 available from Sekisui Plastics Co., Ltd.) after allowing supercritical carbon dioxide (60° C., 28 MPa) to act on the fine particles for 4.5 hours.
Figure 12:
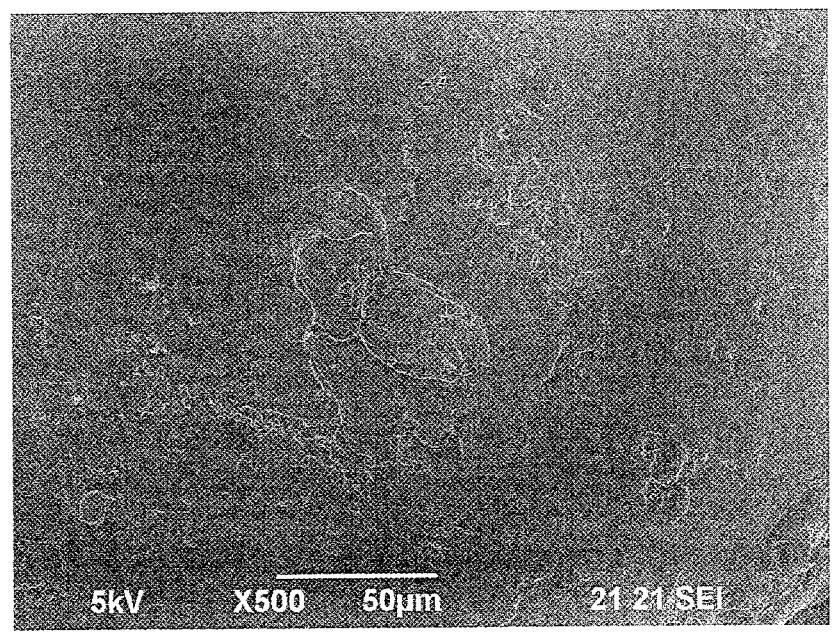
FIG. 12 is a scanning electron micrograph (500×) of polystyrene fine particles (Product No. S-30 available from Sekisui Plastics Co., Ltd.) after allowing supercritical carbon dioxide (60° C., 28 MPa) to act on the fine particles for 4.5 hours.

Polystyrene fine particles which were the material in Example 4 were prepared. FIG. 11 and FIG. 12 show a scanning electron micrograph of the polystyrene fine particles magnified 100 and 500 times, respectively. As can be seen from FIG. 11 and FIG. 12, no graphene-like carbon is present on the surface of the polymethyl methacrylate fine particles and therefore the particles have a smooth surface.

Example 5

A composite material was prepared in the same manner as in Example 4 except for mixing 0.005 g of the same lamina graphite as that in Example 1 and 1.0 g of fine particles of polystyrene (available from Sekisui Plastics Co., Ltd., Product No: S-40, average particle size: 600 μm, Tg: 105° C.). The pressure increased to about 28 MPa at the time of mixing. The surface of the composite material particles prepared was observed by a scanning electron microscope (JCM-5700 made by JEOL Ltd.).

Figure 13:
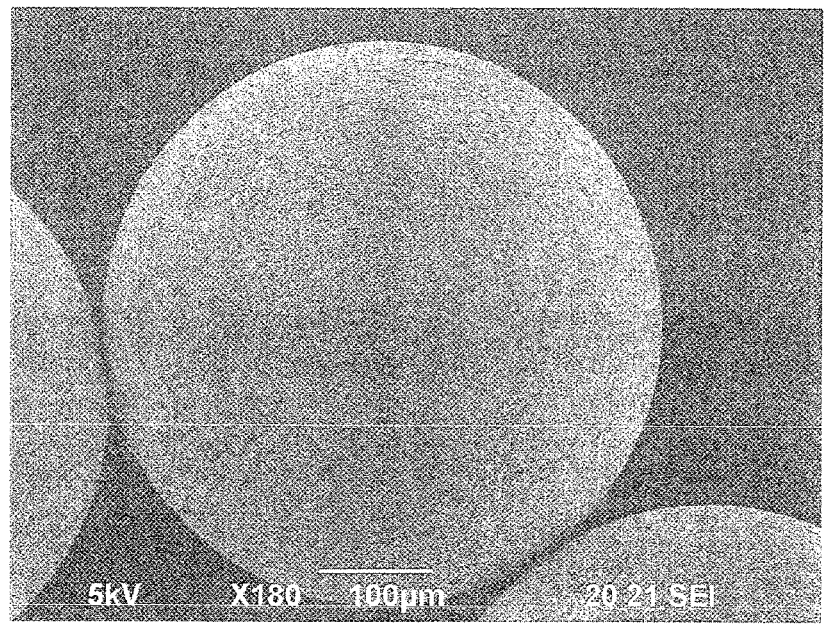
FIG. 13 is a scanning electron micrograph (100×) of fine particles prepared by mixing 1 g of polystyrene fine particles (Product No. S-40 available from Sekisui Plastics Co., Ltd.) and 0.005 g of lamina graphite and allowing supercritical carbon dioxide (60° C., 28 MPa) to act on the mixture for 4.5 hours.

FIG. 13 is a scanning electron micrograph of the composite material particles prepared in Example 5 magnified 100 times. The micrograph of FIG. 13 shows that some of the graphene-like carbon has penetrated the surface of the original substrate particles composed of resin.

Comparative Example 4

Figure 14:
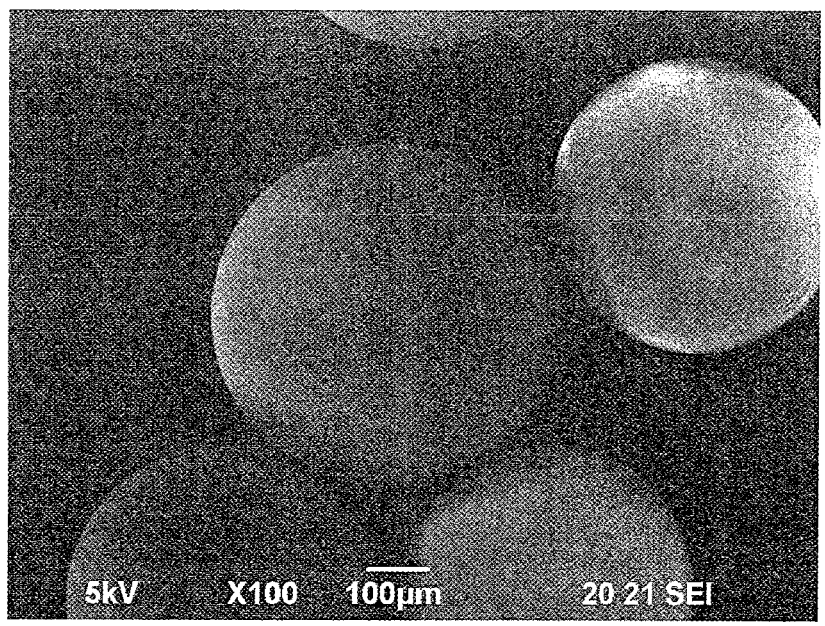
FIG. 14 is a scanning electron micrograph (100×) of polystyrene fine particles (Product No. S-40 available from Sekisui Plastics Co., Ltd.) after allowing supercritical carbon dioxide (60° C., 28 MPa) to act on the fine particles for 4.5 hours.

Polystyrene fine particles which were the material in Example 5 were prepared. FIG. 14 shows a scanning electron micrograph of the polystyrene fine particles magnified 100 times. As can be seen from FIG. 14, no graphene-like carbon is present on the surface of the fine particles and therefore the particles have a smooth surface.

Example 6

A composite material was prepared in the same manner as in Example 3 except for mixing 0.3 g of the same lamina graphite as that in Example 1 and 1.0 g of fine particles of a copolymer of polystyrene and 2-hydroxyethyl methacrylate (available from Sekisui Plastics Co., Ltd., Product No: CS-10, average particle size: 100 μm, Tg: 98° C.), increasing the temperature to 35° C. and stirring for 12 hours. The pressure increased to about 21 MPa at the time of mixing. The surface of the composite material particles prepared was observed by a scanning electron microscope (JCM-5700 made by JEOL Ltd.).

Figure 15:
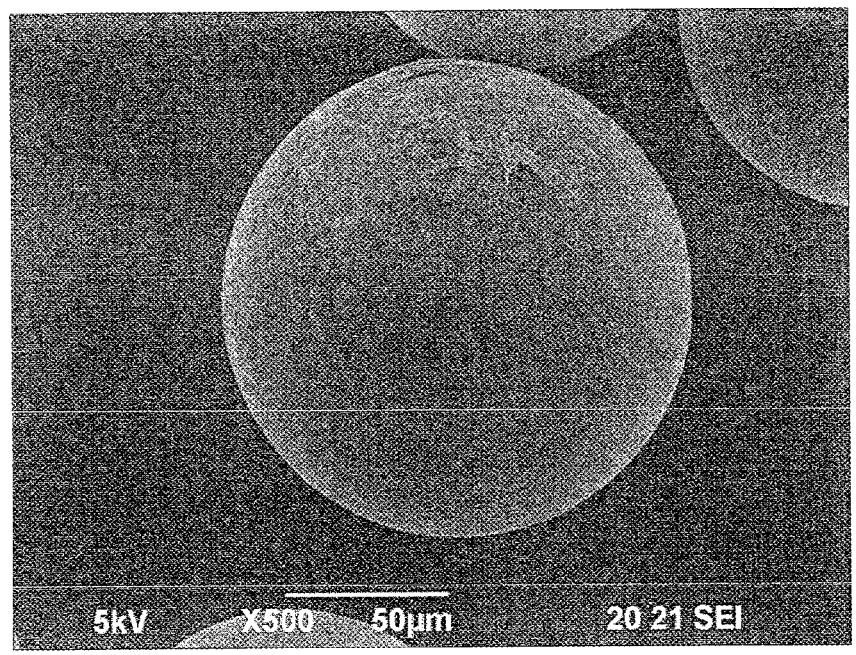
FIG. 15 is a scanning electron micrograph (500×) of fine particles prepared by mixing 1 g of fine particles of a copolymer of polystyrene and 2-hydroxyethyl methacrylate (Product No. CS-10 available from Sekisui Plastics Co., Ltd.) and 0.3 g of lamina graphite and allowing supercritical carbon dioxide (35° C., 21 MPa) to act on the mixture for 12 hours.
Figure 16:
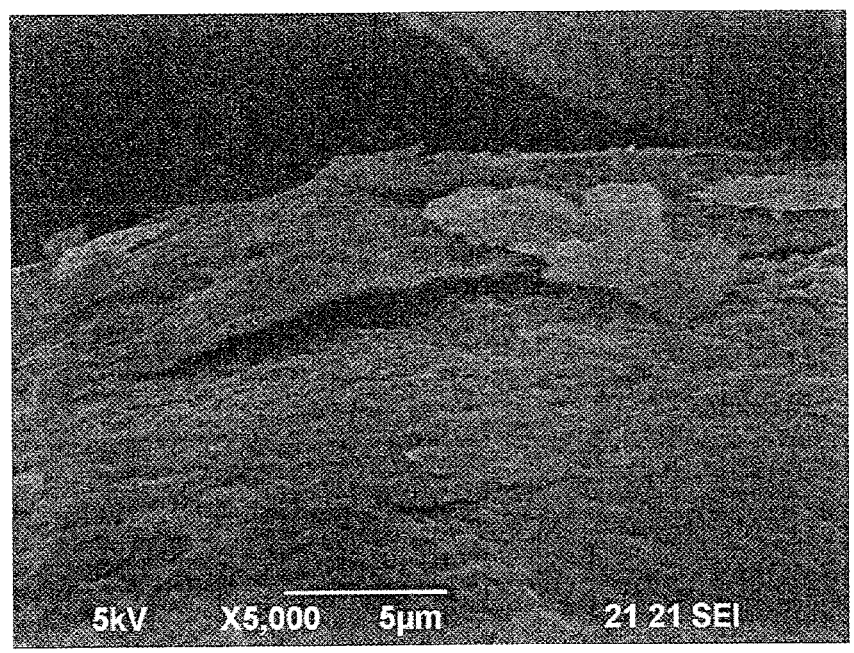
FIG. 16 is a scanning electron micrograph (5000×) of fine particles prepared by mixing 1 g of fine particles of a copolymer of polystyrene and 2-hydroxyethyl methacrylate (Product No. CS-10 available from Sekisui Plastics Co., Ltd.) and 0.3 g of lamina graphite and allowing supercritical carbon dioxide (35° C., 21 MPa) to act on the mixture for 12 hours.

FIG. 15 and FIG. 16 are a scanning electron micrograph of the composite material particles prepared in Example 6 magnified 500 and 5000 times, respectively. The micrographs of FIG. 15 and FIG. 16 show that some of the graphene-like carbon has penetrated the surface of the original substrate particles composed of resin.

Comparative Example 5

Figure 17:
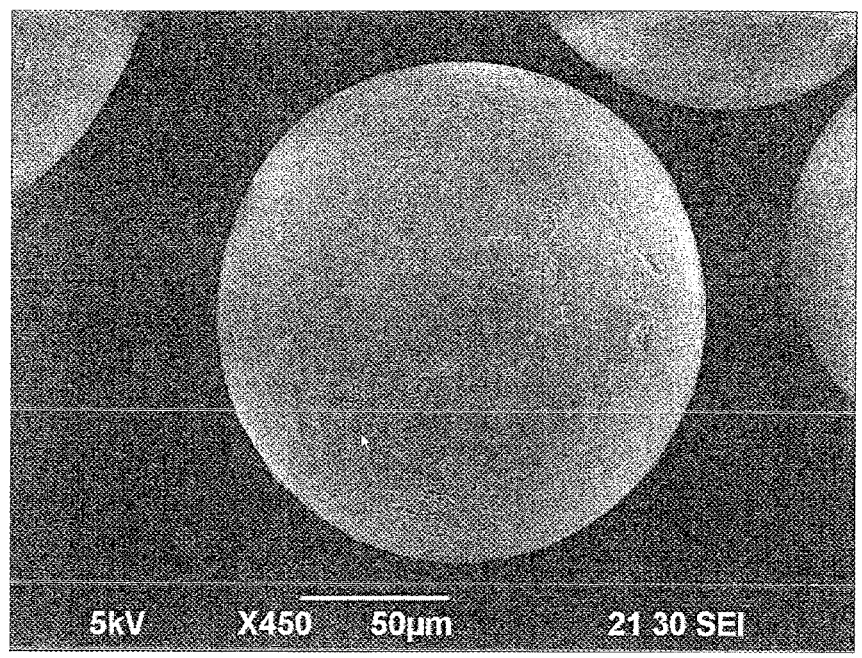
FIG. 17 is a scanning electron micrograph (450×) of fine particles of a copolymer of polystyrene and 2-hydroxyethyl methacrylate (Product No. CS-10 available from Sekisui Plastics Co., Ltd.) after allowing supercritical carbon dioxide (35° C., 21 MPa) to act on the fine particles for 12 hours.

Fine particles of a copolymer of polystyrene and 2-hydroxyethyl methacrylate which were the material in Example 6 were prepared. FIG. 17 shows a scanning electron micrograph of the fine particles magnified 450 times. As can be seen from FIG. 17, no graphene-like carbon is present on the surface of the fine particles and therefore the particles have a smooth surface.

Example 7

A composite material was prepared in the same manner as in Example 3 except for mixing 0.001 g of the same lamina graphite as that in Example 1 and 1.0 g of fine particles of a copolymer of polystyrene and butyl acrylate (available from Sekisui Plastics Co., Ltd., Product No: CS-50, average particle size: 1100 μm, Tg: 46° C.) and stirring with maintaining the temperature at room temperature for 12 hours. The pressure increased to about 28 MPa at the time of mixing. The surface of the composite material particles prepared was observed by a scanning electron microscope (JCM-5700 made by JEOL Ltd.).

Figure 18:
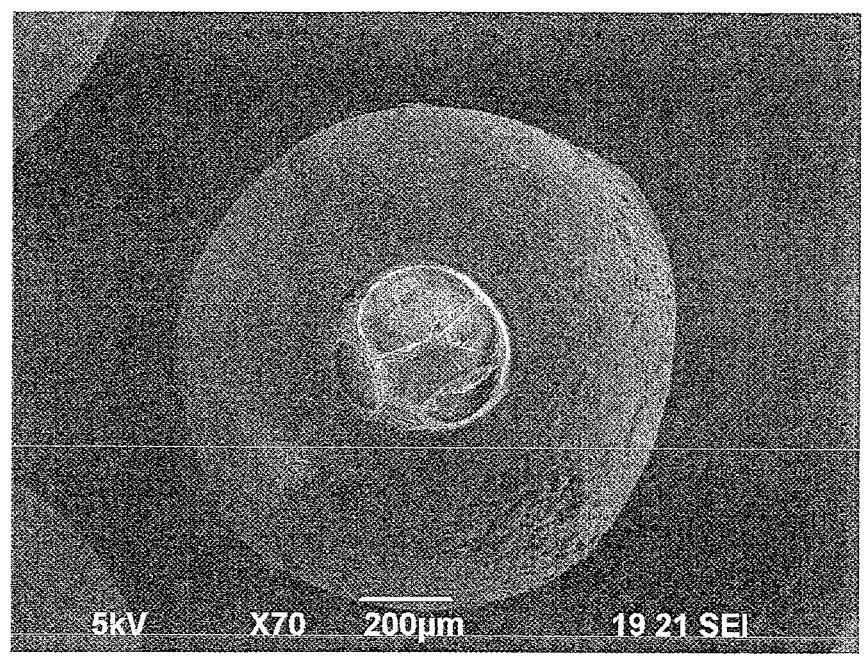
FIG. 18 is a scanning electron micrograph (70×) of fine particles prepared by mixing 1 g of fine particles of a copolymer of polystyrene and 2-hydroxyethyl methacrylate (Product No. CS-50 available from Sekisui Plastics Co., Ltd.) and 0.001 g of lamina graphite and allowing supercritical carbon dioxide (room temperature, 28 MPa) to act on the mixture for 12 hours.

FIG. 18 is a scanning electron micrograph of the composite material particles prepared in Example 7 magnified 70 times. The micrograph of FIG. 18 shows that some of the graphene-like carbon has penetrated the surface of the original substrate particles composed of resin.

Comparative Example 6

Figure 19:
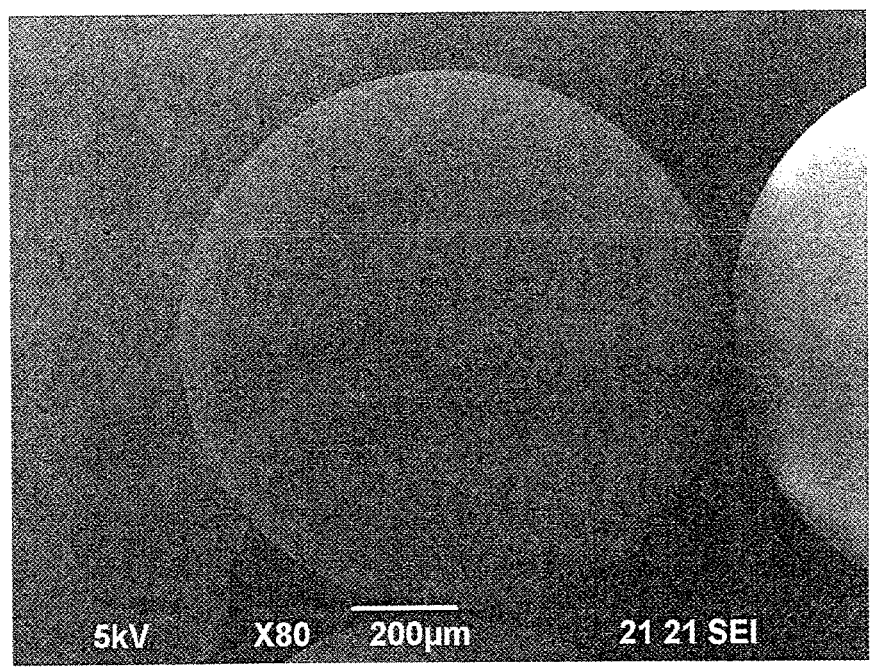
FIG. 19 is a scanning electron micrograph (80×) of fine particles of a copolymer of polystyrene and 2-hydroxyethyl methacrylate (Product No. CS-50 available from Sekisui Plastics Co., Ltd.) after allowing supercritical carbon dioxide (room temperature, 28 MPa) to act on the fine particles for 12 hours.

Fine particles of a copolymer of styrene and butyl acrylate which were the material in Example 7 were prepared. FIG. 19 shows a scanning electron micrograph of the fine particles magnified 80 times. As can be seen from FIG. 19, no graphene-like carbon is present on the surface of the fine particles and therefore the particles have a smooth surface.

The invention claimed is:

1. A composite material comprising a substrate composed of resin and a graphene-like carbon material layer provided so as to cover at least part of the surface of the substrate, wherein graphene-like carbon is attached to and in contact with the surface of the substrate such that some of the graphene-like carbon penetrates the substrate from the surface of the substrate toward an inner part of the substrate.

2. The composite material according to claim 1, wherein the substrate composed of resin is fine resin particles and the graphene-like carbon material layer is formed so as to cover the outer surface of the fine resin particles.

3. The composite material according to claim 1, wherein the substrate composed of resin is a sheet substrate and the graphene-like carbon material layer is provided on at least one side of the sheet substrate.

4. The composite material according to claim 1, wherein the graphene-like carbon material is composed of graphene or lamina graphite.

* * * * *